(12) United States Patent
Stoesz et al.

(10) Patent No.: US 9,360,388 B2
(45) Date of Patent: Jun. 7, 2016

(54) PRESSURE SENSING SYSTEM AND METHOD OF HOUSING A PRESSURE SENSOR

(71) Applicants: Carl W. Stoesz, Blacksburg, VA (US); Sydnee Marie Hammond, Blacksburg, VA (US)

(72) Inventors: Carl W. Stoesz, Blacksburg, VA (US); Sydnee Marie Hammond, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 169 days.

(21) Appl. No.: 13/912,409

(22) Filed: Jun. 7, 2013

(65) Prior Publication Data

US 2014/0360276 A1 Dec. 11, 2014

(51) Int. Cl.
*G01L 9/00* (2006.01)
*G01L 11/02* (2006.01)

(52) U.S. Cl.
CPC ............. *G01L 11/025* (2013.01); *G01L 9/0077* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 6,820,489 B2 | 11/2004 | Fernald et al. | |
| 7,322,247 B2 | 1/2008 | Boyd et al. | |
| 7,958,785 B2 | 6/2011 | Stoesz | |
| 8,417,084 B2 | 4/2013 | Stoesz et al. | |
| 2008/0159687 A1* | 7/2008 | Donlagic et al. | 385/13 |
| 2008/0161602 A1 | 7/2008 | Wang et al. | |
| 2008/0232745 A1 | 9/2008 | Knobloch et al. | |
| 2009/0226128 A1* | 9/2009 | Donlagic et al. | 385/13 |
| 2009/0279099 A1* | 11/2009 | Wang et al. | 356/480 |
| 2010/0064785 A1* | 3/2010 | Kummer et al. | 73/114.19 |
| 2011/0048136 A1* | 3/2011 | Birch et al. | 73/705 |
| 2011/0190640 A1* | 8/2011 | Bremer et al. | 600/478 |
| 2012/0210797 A1* | 8/2012 | Yu et al. | 73/705 |
| 2013/0317372 A1* | 11/2013 | Eberle et al. | 600/478 |
| 2014/0180030 A1* | 6/2014 | Dorando | 600/301 |
| 2014/0208858 A1* | 7/2014 | Jiang et al. | 73/705 |
| 2014/0270623 A1* | 9/2014 | Ahmed et al. | 385/12 |

OTHER PUBLICATIONS

C. Soodak et al., "A Fiber Optic Logging Cable System"; Offshore Technology Conference, May 6, 1985; 8 pages.
G. Somaschini et al., "Subsea Deployment of Instrumented Sand Screens in High-Rate Gas Wells", SPE International; Oct. 4, 2009; 10 pages.
Majeed, M. et al., "Developing High H2S Faciltiy Design Requirements in Conceptual Stage"; SPE International; Dec. 10, 2012; 9 pages.
Notification of Transmittal of the International Search Report and the Written Opinion of the International Searching Authority, or the Declaration; PCT/US2014/035625; Apr. 28, 2014; 12 pages.

* cited by examiner

*Primary Examiner* — Andre Allen
(74) *Attorney, Agent, or Firm* — Cantor Colburn LLP

(57) ABSTRACT

A pressure sensing system includes a pressure sensor, an optical fiber in operable communication with the pressure sensor, and a body having a diaphragm integrally formed therein and separated a distance from the optical fiber.

21 Claims, 2 Drawing Sheets

PRESSURE SENSING SYSTEM AND METHOD OF HOUSING A PRESSURE SENSOR

BACKGROUND

Pressure sensors, such as fiber optic pressure sensors, are often so small and delicate that operators protect them by housing them in larger and more durable structures. These larger and more durable structures have a diaphragm that is deformable to allow pressure outside of the structure to be sensed by the sensor within the structure. Typical structures incorporate a flexible round diaphragm that is sealedly attached to a round bore defined within a cylindrical portion of the structure. This configuration however, results in the structure having radial dimensions that are quite large in comparison to that of the pressure sensor itself. In the downhole industry, space is at a premium. Not surprisingly, the industry is always receptive to new pressure sensor structures and methods of protecting pressure sensors that overcome this issue and others.

BRIEF DESCRIPTION

Disclosed herein is a pressure sensing system. The system includes a pressure sensor, an optical fiber in operable communication with the pressure sensor, and a body having a diaphragm integrally formed therein and separated a distance from the optical fiber.

Further disclosed herein is a method of housing a pressure sensor. The method includes forming a diaphragm integrally in a body, the diaphragm being deformable in response to forces acting thereagainst, and enclosing a pressure sensor within a cavity defined by the body separated a distance from the diaphragm.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
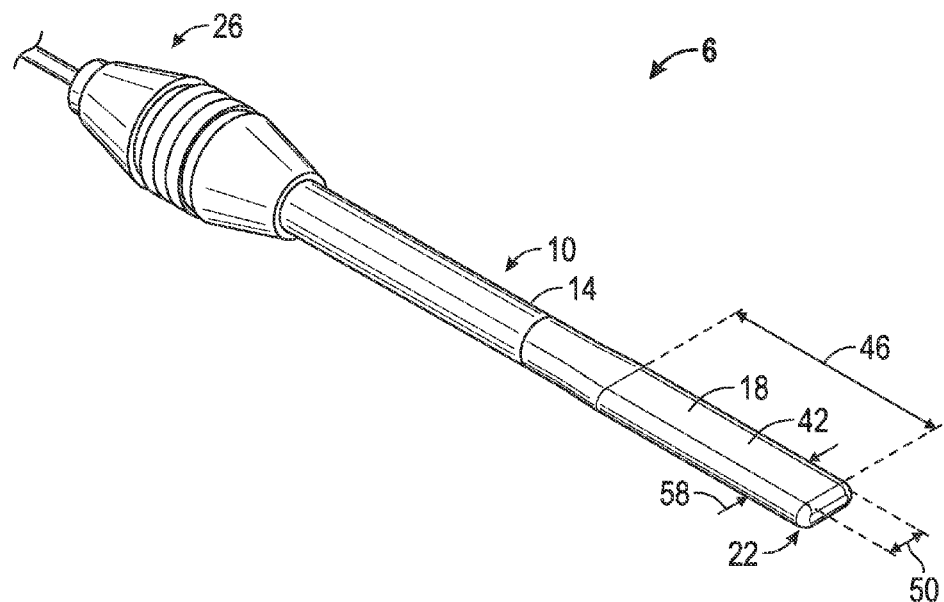
FIG. 1 depicts a perspective view of a pressure sensor housing disclosed herein.
Figure 2:
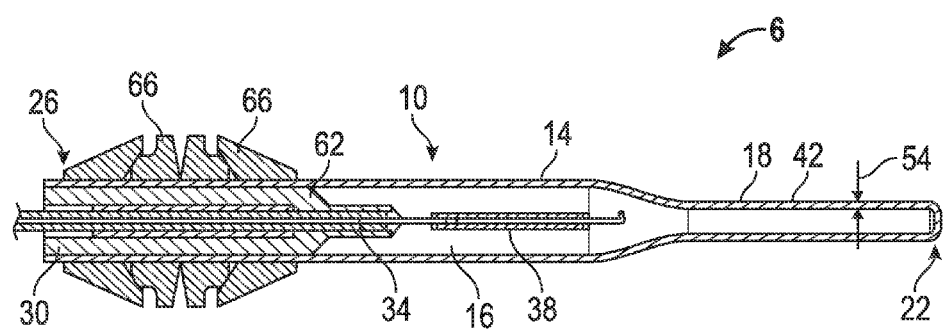
FIG. 2 depicts a cross sectional view of the pressure sensor housing disclosed in FIG. 1.

Referring to FIGS. 1 and 2, an embodiment of a fiber optic pressure sensing system is illustrated at 6. The system 6 includes among other things a housing 10 having a body 14, defining a cavity 16, and having a diaphragm 18 integrally formed as part of the body 14. The diaphragm 18 is deformable in response to forces acting against the diaphragm 18. The body 14 has a first longitudinal end 22 that is seals the cavity 16 from an outside of the body 14 and a second longitudinal end 26 that defines an opening 30 in the body 14. The system 6 further includes an optical fiber 34, in operational communication with a fiber optic pressure sensor 38 in this embodiment positioned within the cavity 16 a distance from the diaphragm 18. The optical fiber 34 extends through the opening 30 and is sealedly engaged to the body 14.

The body 14 is constructed such that the diaphragm 18 is significantly more flexible than the rest of the body 14. As such, when pressure external to the body 14 is altered, substantially only the diaphragm 18 is deformed in comparison to the remainder of the body 14. This deformation of the diaphragm 18 causes a decrease or an increase, depending upon the direction of deformation of the diaphragm 18, in a volume of the cavity 16. Thus, pressure within the cavity 16 is directly proportional to pressure outside of the body 18, thereby allowing the fiber optic pressure sensor 38 to sense pressure outside of the body 14. Filling the cavity 16 with fluid, such as an incompressible fluid, increases transfer efficiency of pressure changes through the diaphragm 18 and to the sensor 38. Additionally, since the fluid fully surrounds the sensor 38 physical loading of the sensor by anything other than pressure in the fluid is avoided. This absence of physical loading is beneficial in embodiments wherein the pressure sensor 38 includes a temperature sensor. Deformation of the diaphragm 18 in this embodiment is elastic, and as such the body 14 can endure a substantially endless number of deformation cycles without becoming permanently deformed.

The body 14 is configured so that pressure changes within the body 14 have a linear relationship to the displacement of at least a portion 42 of the diaphragm 18, for a range of deformation of the portion 42. This allows the housing 10 to also be used to determine displacement. An item for which displacement information is sought can be positioned to be in contact with the portion 42 of the diaphragm 18. Then as the item is displaced the diaphragm 18 will be deformed and a change in pressure within the cavity 16 sensed. The change in pressure is correlated to the amount the item was displaced.

In this embodiment the body 14, prior to being formed into the shape shown in the Figures, has a tubular shape. The first end 22 of the body 14 is formed into a flat rectangular shape to form the diaphragm 18. For manufacturing efficiency two of the bodies 14 are formed during a single operation, such as a hydroforming operation. The two bodies 14 are then separated by a single cut at the first end 22 of each of the two connected bodies 14. After separation the first ends 22 are sealed closed by welding, brazing or via an adhesive, for example. Control of the parameters of the flat rectangular portion of the diaphragm 18 allows an operator to control the deformation characteristics of the diaphragm 18. These parameters include length 46 and width 50 of the rectangular shape as well as thickness 54 of the diaphragm 18. The thickness 54 is a key parameter since the stiffness or rigidity of the diaphragm is proportional to a cube of the thickness 54. As such, the thickness 54 may be finely adjusted through operations such as machining or etching, to achieve tight tolerances likely desired regarding the thickness 54.

Figure 3:
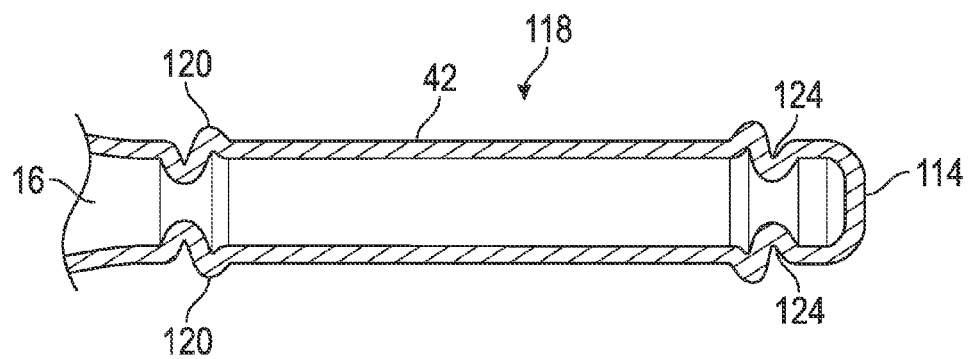
FIG. 3 depicts a partial cross sectional view of an alternate embodiment of a pressure sensor housing disclosed herein.

Referring to FIG. 3, an alternate embodiment of a body 114 having a diaphragm 118 disclosed herein is illustrated in cross section. The diaphragm 118 is similar to the diaphragm 18 in many ways and only the primary differences are discussed hereunder in detail. The diaphragm 118 includes convolutes 120 at the extremes of the rectangular shape of the diaphragm 118. Although a single undulation 124 is employed in the illustrated embodiment of the convolutes 120, any number of practical undulations 120 could be employed. The convolutes 120 provide additional flexibility to the diaphragm 118 and can allow the portion 42 to move a greater distance, even while retaining a linear relationship between displacement of the portion 42 and pressure changes within the cavity 16. It should be highlighted that either or both of the bodies 114 and 14 can have just one of the diaphragms 18, 118, or could include two of the diaphragms 18, 118. The body 114 is illustrated as having two of the diaphragms 118 thereon that are located on the body 114 opposite one another. Having two diaphragms 118 can provide more flexibility in how and where the body 114 can be employed. In bodies 14, 114 having just one of the diaphragms 18, 118 a surface opposite that of diaphragm 18, 118 can be made intentionally thicker or with ribs (not shown) that stiffen that surface significantly to prevent it from flexing under loads that cause the diaphragms 18, 118 to flex. Regardless of whether one or two diaphragms are employed the body 14, 114 should be configured with sufficient clearance for the diaphragm 18, 118 to travel a maximum distance anticipated in an application without contacting any other portion of the system 6 to avoid malfunctioning of the device.

Since the diaphragm 18 is integrally formed as part of the body 14 it is made of the same material and further as part of the same piece of the same material as the body 14. As such, there are no seals that need to be created between the diaphragm 18 and the body 14, thereby simplifying the manufacturing process, reducing potential failure modes related to leak paths and likely lowering both product and process costs. Since the diaphragm 18 is parallel to a longitudinal orientation of the optical fiber 34 and the pressure sensor 38 the body 14 can have a much smaller maximum radial dimension 58 for a given area of the diaphragm 18 than if the diaphragm 18 were perpendicular to the optical fiber 34 and the pressure sensor 38 as is typical in conventional pressure sensor housing arrangements.

Referring again to FIG. 2, an embodiment of the sealing of the body 14 at the opening 30 to the optical fiber 34 is illustrated in detail. The optical fiber 34 is sealingly engaged to a header 62 that is sized to fit within the opening 30. One or more ferrules 66, with four being shown, positioned radially outwardly of the body 14 and in longitudinal alignment with the header 62 are permanently deformed through a process such as swaging, for example. The deformation of the ferrules 66 radially compresses the body 14 through interference therewith between the header 62 and the ferrules 66, thereby creating a seal between the header 62 and the body 14. This configuration allows the body 14 to be made of a variety of materials such as metals, polymers and glass, for example. For embodiments wherein the body 14 is metal and the header 62 is metal, the seal created is a metal-to-metal seal.

Figure 4:
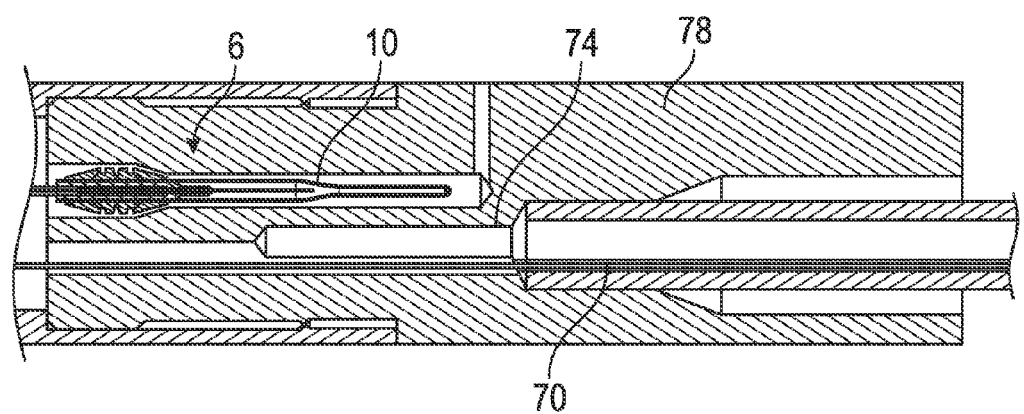
FIG. 4 depicts a cross sectional view of the pressure sensor housing of FIG. 1 disposed in a downhole tool.

Referring to FIG. 4, by having a small maximum radial dimension 58 (see FIG. 1) the sensor housing 10 allows for greater flexibility in packaging. Downhole industries such as hydrocarbon recovery and carbon dioxide sequestration, for example, can benefit from the smaller size provided by the housing 10. In these industries it is often desirable to have a plurality of the pressure sensors 38 positioned at various longitudinal locations within a borehole in an earth formation. The relatively large radial dimensions of typical pressure sensor housings make running additional optical fiber cables past such a housing difficult if not impossible. The relatively small radial dimensions of the housing 10 allow room to run additional optical fiber cables 70 through a passageway 74 in a downhole tool 78 to other pressure sensors located longitudinally therebeyond even while taking larger radial dimension of the ferrules 66 into consideration.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A pressure sensing system, comprising:
a pressure sensor;
an optical fiber in operable communication with the pressure sensor; and
a body disposed about the pressure sensor and the optical fiber, the body including a first end, a second end and an intermediate portion defining a cavity, the second end defining a diaphragm fluidically connected with the cavity, the body being separated a distance from the optical fiber arranged within the cavity, wherein operation of the pressure sensor is independent of changes in distance between the optical fiber and the diaphragm.

2. The pressure sensing system of claim 1, wherein the body defines a cavity housing the pressure sensor and is sealedly engaged with the optical fiber extending through an opening in the body.

3. The pressure sensing system of claim 2, wherein volume of the cavity when the body is sealed to an optical fiber is changed when the diaphragm is deformed.

4. The pressure sensing system of claim 3, wherein pressure in the cavity changes in response to deformation of the diaphragm.

5. The pressure sensing system of claim 2, wherein a relationship between displacement of a portion of the diaphragm and pressure changes within the cavity are linear.

6. The pressure sensing system of claim 2, wherein pressure changes within the cavity are transmitted to the pressure sensor within the cavity by a fluid.

7. The pressure sensing system of claim 1, wherein the diaphragm is configured to deform in response to forces acting thereagainst.

8. The pressure sensing system of claim 1, wherein the optical fiber is in operable communication with the pressure sensor.

9. The pressure sensing system of claim 1, wherein the diaphragm is flat.

10. The pressure sensing system of claim 1, wherein the diaphragm is rectangular.

11. The pressure sensing system of claim 1, wherein the body is sealedly engagable with a header that is sealedly engaged to the optical fiber.

12. The pressure sensing system of claim 11, wherein the body is radially compressed against the header by at least one ferrule deformed into radial interference with the body.

13. The pressure sensing system of claim 1, wherein the body is one of metal, polymer and glass.

14. The pressure sensing system of claim 1, wherein the body is configured such that substantially only the diaphragm is deformable.

15. A method of housing a pressure sensor, comprising:
   forming a diaphragm integrally in a body, the diaphragm being deformable in response to forces acting thereagainst;
   enclosing a pressure sensor within a cavity defined by the body and the diaphragm, the pressure sensor being separated a distance from the diaphragm; and
   functionally connecting an optical fiber to the pressure sensor with distance changes between the optical fiber and the diaphragm being independent of operation of the pressure sensor.

16. The method of housing a pressure sensor of claim 15, further comprising swaging a ferrule to radially compress the body between the ferrule and a header sealed to the optical fiber.

17. The method of housing a pressure sensor of claim 15, wherein the forming the diaphragm includes flattening a rectangular portion of the body.

18. The method of housing a pressure sensor of claim 15, wherein the forming the diaphragm includes altering a thickness of the body at the diaphragm.

19. The method of housing a pressure sensor of claim 15, wherein the forming a diaphragm is through hydroforming.

20. The method of housing a pressure sensor of claim 15, further comprising etching or machining the diaphragm.

21. The method of housing a pressure sensor of claim 15, wherein the forming a diaphragm includes creating convolutions in the body.

* * * * *